UNITED STATES PATENT OFFICE.

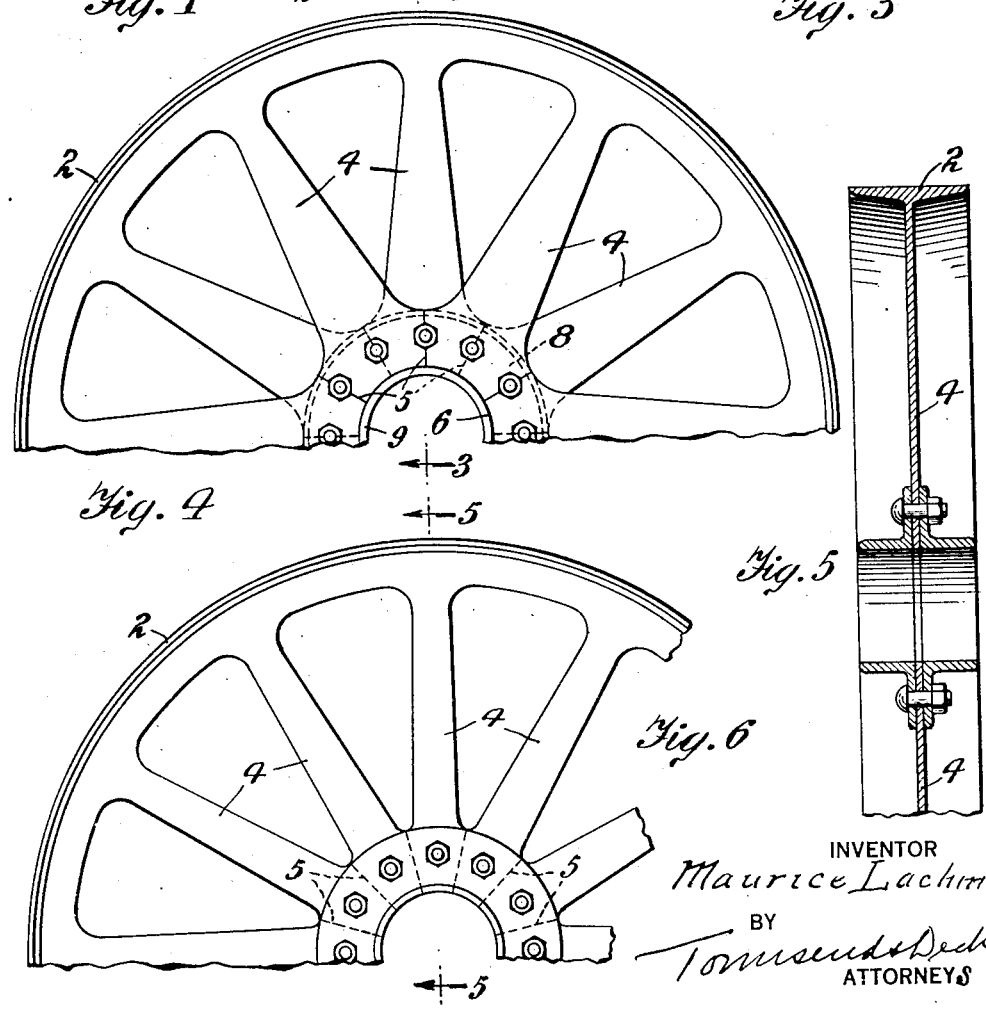

MAURICE LACHMAN, OF NEW YORK, N. Y., ASSIGNOR, BY MESNE ASSIGNMENTS, TO BETHLEHEM STEEL COMPANY, OF BETHLEHEM, PENNSYLVANIA, A CORPORATION OF PENNSYLVANIA.

WHEEL.

1,338,936.

Specification of Letters Patent.

Patented May 4, 1920.

Application filed April 2, 1919. Serial No. 286,933.

*To all whom it may concern:*

Be it known that I, MAURICE LACHMAN, a citizen of the United States, and a resident of New York, in the county of New York and State of New York, have invented certain new and useful Improvements in Wheels, of which the following is a specification.

My invention relates to the construction and method of manufacturing that class of wheels in which the rim and spokes are both of metal.

The object of my invention is to provide a wheel in which the continuous rim and spokes shall be integral with one another and consist essentially of a section of flanged metal beam the flange of which composes the continuous rim while the spokes consist of the web of the bar or beam suitably cut or punched to form said spokes.

A further object is to produce a wheel of this construction free from pronounced flats and bulges in the surface of the rim.

In carrying out my invention I may use any form of flanged metal bar or beam wherein there is a flanged or projecting part suitable for forming the continuous rim and a web part at right angles to said flanged part which may be cut out or punched to form the separate spokes. It is preferable, however, to employ either an I-beam or bar or a T-beam or bar for the purpose since in this commercial form of bar metal the web is disposed centrally of the head. For economy of material it is preferable to employ an I-beam since less of the web is waste and two wheels may be formed from the same section of I-beam.

When referring in the appended claims to a T-bar or T-section I do not mean to limit myself to cutting the web of a bar or section having only one flange but mean to include also cutting such sections as an I or other flanged section, having two flanges, each of which sections, when cut, form two sections each of which is composed of a web portion and a single flange portion. The section, in the form in which it is about to be bent to the shape of a wheel, is one which has only one flange, and this is exemplified by a T-section.

In the accompanying drawings:

Figure 1 is a cross-section of a form of beam or bar suitable for use in carrying out my invention.

Fig. 2 is a side elevation of a section or portion of the bar or beam of I form such as shown in Fig. 1 suitably cut or slit in its web part for forming the wheel by bending the heads into the circumference of the rim.

Fig. 3 is a cross-section of a wheel in which the T or I-bar is embodied.

Fig. 4 is a side elevation of said wheel.

Fig. 5 is a cross-section of a wheel showing a different disposition of the separate spokes formed from the web part of the beam.

Fig. 6 is a side elevation of said wheel.

Referring to Fig. 1, I have shown a section of I-beam or bar suitable for use in carrying out my invention. As will appear from the subjoined description, instead of using an I-bar or beam a T-bar will serve the same general purpose and so far as shape of bar is concerned, will be substantially the same as the bar shown in Fig. 1 excepting that one of the heads 2 or 2′ will be omitted. As will be obvious, said T-bar or I-bar is in effect a flanged metal bar the flange or head of which is a projection from a web part at right angles to the plane of the web and said web part might be differently disposed with relation to the edges of the flanged part although a central disposition of the same is preferable.

To form the wheel a length of I or T-bar is taken sufficient to provide in the flange 2 or 2′ a length preferably sufficient to constitute the whole rim of the wheel when bent to form. The web part 3 is then cut or split to provide spokes 4, 4′, the spokes 4 extending integral from the one head 2 and the spokes 4′ from the head 2′. Preferably the ends of the spokes are formed in the shape of a keystone by cutting them on lines 5 which, in the finished wheel, are radial lines radiating from the wheel center and which are adapted to abut against the similar edges of adjoining spokes in the area of the hub of the wheel and make a practically continuous circumferential metal hub member. Preferably also the extreme inner end of each spoke is cut on a curved line 6 which follows the contour of the hub barrel and is adapted to seat on the same.

In cutting out the web of the blank section of bar the portions 7 of said web are waste material. The web having been cut as indicated, the two sides may evidently be drawn apart, thus providing two sections each consisting of a member 4 or 4' integral therewith and adapted to form the separated spoke members of the wheel.

To form each section into the wheel the head 2 or 2' is bent around into the circumference of the rim, such bending operation evidently bringing the inner ends of the spoke members into assembly at the hub part of the wheel and, by giving a proper angle to the edges, or cuts 5, the hub ends of said spokes will abut against one another at said edges and as indicated in the side view of the finished wheel Fig. 4 and Fig. 6.

By cutting out the web to form separate spokes as shown separated at their outer ends next the rim, extended spaces between the spokes are provided leaving a length of flange beneath which the web is sufficiently reduced in depth to permit said web to be bent to an arc of a circle the same as the circumference of the rim, while by leaving a portion of the web as indicated, not sufficient however to prevent the bending of the bar, a reinforcing rib parallel with the arc of rim is provided beneath the rim and arc thereof extending from spoke to spoke and unsupported by the spokes. The extent of the space between the outer ends of the spokes embracing the unsupported arc of the rim between them in the finished wheel is as great as possible consistent with proper strength at the union of spoke and rim. The extent of the space shown is proportionally greater than the width of the spoke at its outer end and the width of the spoke at the rim is such that it will not prevent bending the part of the rim in line with the spoke into the arc of a circle. The result of thus cutting out the web between the spokes is that the rim may be bent into a substantially true circle without the formation of extended flats or of pronounced bulges.

In addition to bending the head of the flange into the circumference of the rim the members 4 of the web may be bent alternately outward from the plane of the web as shown in Fig. 3 and their free ends may be attached or bolted to the sides of the hub 8, the curved edges 6 seating if desired upon the periphery of the hub barrel 9.

In the particular illustration of my invention as so far described the web of the metal bar is formed in the proper way to form a wheel of twelve spokes spaced equally apart, six of said spokes being disposed at one side or bent for attachment to one end of the hub and six bent in alternation for attachment to the opposite end of the hub.

In the modification illustrated in Figs. 5 and 6, the twelve spokes of the wheel are all disposed in the same plane and all engage with one another at their hub ends edge to edge. In this instance the cuts or edges 5 made in the web are at such angle as to bound arcs of thirty degrees instead of arcs of sixty degrees as in Figs. 2 and 5 whereby the spokes at the hub ends fill in the full circumference of the hub part of the completed wheel and abut edge to edge.

It will be understood that by the terms "slit" and "cut" as applied to the manner of forming the spokes from the web of the beam any method of forming the spokes is intended and included as for instance, stamping, punching, sawing, cutting or slitting in any suitable manner.

A tire for the wheel may be secured to the wheel rim 2 in any desired way or the wheel rim 2 may be so formed that it will itself hold the tire as will be readily understood by those skilled in the art.

What I claim as my invention is:—

1. A metal wheel made from a unitary rolled bar of T section and having its spokes an integral part of the rim, said spokes being separated from each other throughout the major longitudinal portion thereof and contacting with each other only at the hub.

2. A metal wheel having a continuous rim and spokes integral with said rim, said rim formed of the head of a T bar and said spokes formed from the web of the bar, the ends of said spokes being cut at their hub end to engage one another on radial lines when the head is bent to form the rim and the outer ends of the spokes being separated from one another by spaces spanned by arcs of the rim of substantially uniform depth from spoke to spoke.

3. A metal wheel having a continuous rim and spokes integral with said rim, said rim being formed of the head of a T bar and said spokes formed from the web of the bar, the rim ends of said spokes being smaller than the hub ends and formed at their hub ends to engage one another on radial lines when the bar is bent to form the rim.

4. A metal wheel formed of a section of T bar the head of which constitutes a continous rim of the wheel while the web is cut into spokes bent alternately out of the plane of the web for attachment to opposite ends of the hub, said alternate spokes engaging one another at the hub only and filling out the whole circumference of the hub at both ends of said hub.

5. A metal wheel having a continuous rim and spokes integral with the rim, said rim being formed from the flanged portion of a bar and the spokes from the web of the bar, the spokes at their hub ends being in shape of a keystone and engaging one another on radial lines in the area of the hub when the bar is bent to form the rim, the spokes intermediate the hub and rim being out of contact with each other.

6. A metal wheel having a continuous rim and spokes integral with said rim, said rim being formed from the flanged portion of a bar and the spokes from the web of the bar, the spokes being bent alternately to form two complete circles, one at each end of the hub, the spokes of each set being in side contact in the area of the hub at the portion at which the spoke is widest.

7. A metal wheel having a continuous rim and spokes integral with the rim, said rim being formed from the flanged portion of a bar and the spokes from the web of the bar, the spokes at their hub ends being in shape of a keystone and engaging one another on radial lines in the area of the hub when the bar is bent to form the rim, the spokes intermediate the hub and rim being out of contact with each other and the spokes being bent alternately to form two complete circles, one at each end of the hub.

8. The method of constructing metal wheels having spokes integral with the rim, consisting in providing a rolled metal bar of T section, cutting or removing such portions of the web as will leave spokes separated from each other by material distances and joined to the head of said bar by a comparatively small amount of metal whereby the retained metal will not prevent bending the head into an arc and then bending the head of said bar to form a true circular rim and cause the ends of the spokes to converge at the hub.

9. The method of manufacturing metal wheels consisting in rolling a bar having a T section, cutting out portions of the web of said section to form spokes wider at the hub end than at the part adjacent the rim and of such size as not to interfere with bending the rim into a substantially true circle, then bending the head of said bar into a complete circle whereby a true circular rim is formed having integral spokes separated at the rim end and in side contact at the hub end.

10. The method of manufacturing metal wheels consisting in providing a bar having a T section, cutting out portions of the web to form separated spokes integral with the head of said section, bending the free ends of alternate spokes transversely to the plane of the wheel, bending the head of the bar around to form a true circular rim and assembling the alternate spokes together to form opposite ends of the hub.

11. The method of manufacturing metal wheels which comprises providing a bar having a flanged portion, cutting out parts of the web of the bar to form separated spokes integral with the flanged portion, bending the free ends of the spokes alternately out of the normal plane of the web, bending the flanged portion around to form a rim of true circular shape and assembling the sets of alternately bent spokes together to fill out the complete circumference of the hub at both of its ends with the spokes of each set in side contact in the area of the hub.

12. The method of manufacturing metal wheels which comprises providing a section of I beam or bar, cutting the web inwardly from each head of the bar toward the opposite head to form spokes separated from each other by material distances and providing a keystone shaped end on each spoke, separating the sections of bar thus formed, staggering alternate spokes out of the normal plane of the web of said bar and bending the head of said bar around to form a true circular rim and cause the ends of the spokes to abut on radial lines and form a continuous circle at each end of the hub.

Signed at New York, in the county of New York and State of New York, this 31st day of March, A. D. 1919.

MAURICE LACHMAN.

Witnesses:
    F. B. TOWNSEND,
    IRENE LEPKOWITZ.